United States Patent
Gershenfeld et al.

(10) Patent No.: US 8,473,093 B2
(45) Date of Patent: Jun. 25, 2013

(54) METHODS AND APPARATUS FOR ONLINE CALORIMETRY

(75) Inventors: Neil Gershenfeld, Somerville, MA (US);
Nadya Peek, Cambridge, MA (US);
Kenneth Cheung, Boston, MA (US);
David Watson, Newtownabbey (GB)

(73) Assignee: Massachusetts Institute of Technology, Cambridge, MA (US)

( * ) Notice: Subject to any disclaimer, the term of this patent is extended or adjusted under 35 U.S.C. 154(b) by 31 days.

(21) Appl. No.: 13/365,199

(22) Filed: Feb. 2, 2012

(65) Prior Publication Data

US 2012/0303153 A1 Nov. 29, 2012

Related U.S. Application Data

(60) Provisional application No. 61/439,688, filed on Feb. 4, 2011.

(51) Int. Cl.
*B29C 39/00* (2006.01)
*G06F 19/00* (2011.01)
*G06G 7/66* (2006.01)

(52) U.S. Cl.
USPC ............ 700/197; 700/198; 700/204; 700/205

(58) Field of Classification Search
USPC .................................. 700/197–198, 204–205
See application file for complete search history.

(56) References Cited

U.S. PATENT DOCUMENTS

| | | | |
|---|---|---|---|
| 5,158,132 A | 10/1992 | Guillemot | |
| 5,582,757 A | 12/1996 | Kio et al. | |
| 6,327,793 B1 | 12/2001 | Gurer et al. | |
| 6,490,501 B1* | 12/2002 | Saunders | 700/198 |
| 6,675,112 B1* | 1/2004 | Chadwick | 702/56 |
| 7,043,326 B2* | 5/2006 | Neubauer et al. | 700/117 |
| 7,824,165 B2 | 11/2010 | Davie et al. | |
| 2006/0123914 A1* | 6/2006 | Pena et al. | 73/629 |
| 2007/0185611 A1* | 8/2007 | Magill et al. | 700/199 |
| 2008/0175753 A1 | 7/2008 | Clothier | |
| 2009/0092522 A1 | 4/2009 | Gregg et al. | |
| 2009/0295036 A1 | 12/2009 | Zimmerman | |
| 2010/0232877 A1* | 9/2010 | Sanvik et al. | 404/77 |
| 2011/0043223 A1* | 2/2011 | Canos Marin et al. | 324/646 |
| 2013/0002268 A1* | 1/2013 | Kumar et al. | 324/679 |

OTHER PUBLICATIONS

Communication from International Searching Authority, dated Apr. 5, 2012, regarding PCT/US2012/023836 (including international search report and written opinion of international searching authority).

A. Pullen, D. Attwood, I. Partridge, M. Batchelor, G. Cracknell, Remote Cure Sensing of Polymer Composites, presented at RTO AVT Workshop on Intelligent Processing of High Performance Materials, held at Brussels, Belgium, May 13-14, 1998, published in RTO MP-9.

\* cited by examiner

*Primary Examiner* — Ronald Hartman, Jr.
(74) *Attorney, Agent, or Firm* — Stephen R. Otis (57) ABSTRACT

In exemplary implementations of this invention, a network of nodes controls and senses the cure of a thermosetting plastic in a component that is made of fiber composite material. The network comprises multiple nodes, which are separated spatially from each other. Each of the nodes, respectively, comprises a heat transfer device for actively transferring thermal energy, a temperature sensor for taking local temperature measurements, and a processor. In each of the nodes, respectively: (a) the processor locally performs closed loop control over the temperature of the heat transfer device, and (b) the closed loop control is based at least in part on the local temperature measurements and on estimated or measured input current to the heat transfer device.

20 Claims, 6 Drawing Sheets

METHODS AND APPARATUS FOR ONLINE CALORIMETRY

RELATED APPLICATIONS

This application claims the benefit of U.S. Provisional Application Ser. No. 61/439,688, filed Feb. 4, 2011, the entire disclosure of which is herein incorporated by reference.

STATEMENT REGARDING FEDERALLY SPONSORED RESEARCH OR DEVELOPMENT

This invention was made with U.S. government support under Grant Number W911NF-08-1-0254, awarded by the Defense Advanced Research Projects Agency. The government has certain rights in this invention.

FIELD OF THE TECHNOLOGY

The present invention relates generally to calorimetry.

BACKGROUND

The commercial aerospace industry has been moving towards aircraft designs that have fewer but larger individual fiber composite parts. Conventional manufacturing processes have scaled up accordingly, and have already begun to require tools (for defining the shape of the part) and ovens (for polymer matrix curing) that are large enough to push the size of the buildings that must contain them.

Commercially available cure sensing technologies (such as dielectric cure monitoring) are very expensive, and many rely on the ability to embed non-structural components within the parts, which adversely affects the structural characteristics of the part. Both of these attributes detract from the ability to apply the sensor technologies in a distributed manner.

Current composite manufacturing techniques can be quite unwieldy, and not particularly energy efficient. For advanced high-temperature epoxies used in airplanes, the methods for curing and testing wings are scaled up versions of methods used on much smaller parts. For example, it is now common practice to cure composite jet wings in airplane-sized autoclaves.

High-performance composites are often made with two-part epoxy resins. The curing process of epoxy resins is an exothermic reaction that can be regulated by varying the surrounding temperature and the ratios of the hardener and resin. Current practices for monitoring epoxy curing are either imprecise or very expensive.

A conventional practice for testing whether the epoxy has finished curing is to check ajar of epoxy curing outside the mold. The assumption is, if the jar of epoxy is cured, the part curing in the mold must be cured as well. This is not always accurate, and some more sophisticated methods are also in use. These include monitoring the optical qualities of the resin, checking for a change in opacity in the cured part, or monitoring the dielectric constant of the curing part, waiting for the constant to cross some threshold. These require specialized sensors specifically for the epoxy resins being used, and need to be tuned for each curing process.

Some attempts have been made to use differential scanning calorimetry to check for the end of the exothermic epoxy curing reaction. These attempts remain limited however, for they employ an autoclave to heat the mold and component—not an easily scalable process.

SUMMARY

In illustrative embodiments of this invention, a network of control nodes is embedded in tooling. The tooling is used for manufacturing composite parts. Each of the control nodes, respectively, can sense and precisely control local temperature, in order to control the cure of a thermosetting polymer. Each node performs local closed loop control, using calorimetry to determine stages in cure cycles. The nodes are connected in a network.

In this network, globally optimal curing (of inhomogeneous or homogenous parts) is achieved by using distributed local control.

In illustrative implementations, each of the control nodes includes a device to actively perform heat transfer (e.g. resistive heater or peltier cooler), another device to monitor temperature (e.g. thermistor or thermocouple), and an electronics package. Each of the control nodes locally performs closed loop control over (a) the heat transfer device and (b) calorimetric sensing of the state of material adjacent to the node. Additionally, each control unit effectively functions as a networked device.

In illustrative implementations, an APA (Asynchronous Packet Automata) network is used. APA is a new networking protocol where the (variable length) address of the node is the route to the node. This makes routing packets easier, as network addresses equal spatial coordinates. When a packet arrives at its destination node, that node processes the packet payload and responds accordingly. To get to the destination node, the packet travels through a mesh-type network, where each node will not accept a new packet until the previous one has been processed. This introduces back-pressure flow control into the processing network, avoiding network jams in the system. Advantageously, an APA network is easily scalable.

In illustrative implementations, a smart mold is used for local control (instead of using an autoclave, which does not allow local control). Local control is used to achieve a globally better part. In this smart mold, heating and sensing are embedded in the mold itself. This smart mold allows greater flexibility of part sizes and shapes, robust and adaptive control over cure characteristics, and increased energy efficiency in the production process. The smart mold can be used to advantage in many practical applications, such as in the fabrication of aerospace composite parts.

In illustrative implementations of this invention, distributed and networked control nodes perform closed loop temperature control for inhomogeneous exothermic or endothermic processes. Advantageously, this temperature control allows the conventional autoclave used for the cure cycle to be replaced with active tooling, allowing greater flexibility of part sizes and shapes, robust and adaptive control over cure characteristics, and increased energy efficiency in the production process. For example, this temperature control can be applied to heating and cure sensing of thermoset polymer resins for aerospace applications.

In illustrative implementations, this invention may be employed for various calorimetric methods, such as Differential Scanning calorimetry, Differential Thermal calorimetry, or Differential Thermal Analysis. For example, a heat transfer device may be driven at a constant temperature while power is varied to keep the temperature constant (e.g., a reduction in power may be needed to compensate for thermal energy generated by an exothermic cure process). Or, for example, a heat transfer device may be driven at a constant power while temperature is measured over time. A clear calorimetric signature (e.g., in the form of excursions in power, or excursions in temperature) is typically evident at the onset and completion of exothermic or endothermic processes. This signature can be used, for example, for estimation of the degree of cure of a thermoset polymer part based on the part's heat absorption and/or generation during cure. In addition to or in the absence of a detectable exothermic or endothermic process, changes in the heat capacity of a cure process can provide another cure signal.

In some implementations of this invention, heat transfer devices also function as temperature detectors, and are used instead of separate devices for these purposes. For example, the changing resistance of a heater wire may be used as a RTD (resistance temperature detector), by alternating between heating and sensing.

In some instantiations of this invention, material that is being manufactured is employed as part of the heat transfer device or temperature detector. For example, structural carbon fiber may be employed as the heating elements and temperature detectors. Carbon fiber heating elements are commercially available, and the use of graphite resistors as RTDs is common practice. In this embodiment, the electronics package of this invention is set up to couple to the material (e.g. carbon fiber), either conductively or electromagnetically (e.g. inductive heating and resistance temperature detection). Advantageously, a structural carbon fiber composite part can intrinsically contain all of the necessary physical attributes for heating and temperature sensing. This is because the carbon fibers are conductive, display resistive heating, and display resistance change in response to temperature. Thus, measurements can be taken deep inside a part—instead of just at the surface—without displacing structural components within the part. For example, coupling to the carbon fibers can be done via induction (instead of, say, metallic leads embedded in the part). Anisotropic fiber layups (e.g., a panel with mostly unidirectional fibers) will display anisotropic resistance characteristics, which can be dynamically accounted for.

In cases where the part material itself is integrated into this invention as the heat transfer and cure sensing devices, additional active sensing properties may be employed. For example, lifespan uses—of the coupling—may include strain sensing, delamination failure sensing (health monitoring), and even computational logic.

Spatial distribution of the control nodes over the surface of the tool may be automatically accomplished through algorithmic distribution across the surface of a three dimensional part.

In illustrative implementations of this invention, heating and sensing are incorporated into the tooling. This approach is well suited for large-scale tools. In some instantiations of this invention, many discrete units are connected together and covered with a skin to make the tooling. The discrete units are simple, with low cost per unit, which makes them good candidates for easy adaptation to various processes for various materials at any scale. This is advantageous because thermoset polymers may be fabricated with a wide range of materials that have a wide range of thermal properties.

The above description of the present invention is just a summary. It is intended only to give a general introduction to some illustrative implementations of this invention. It does not describe all of the details of this invention. This invention may be implemented in many other ways.

The above Figures illustrate some exemplary implementations of this invention, or provide information that relates to those implementations. However, this invention may be implemented in many other ways. The above Figures do not show all of the details of this invention.

DETAILED DESCRIPTION

This invention may be implemented using a reaction calorimeter using power compensation measurements. Here is a first example:

In this first example, a mold includes embedded nodes for performing reaction calorimetry, to measure the rate of exothermic curing reactions while an epoxy is in the mold. The mold is used to manufacture carbon fiber composite parts (e.g. for use in the aerospace industry). A component in these parts is a thermoset polymer matrix, which is heated to reach cure temperature. The polymer exhibits an exothermic cure process.

Figure 1A:
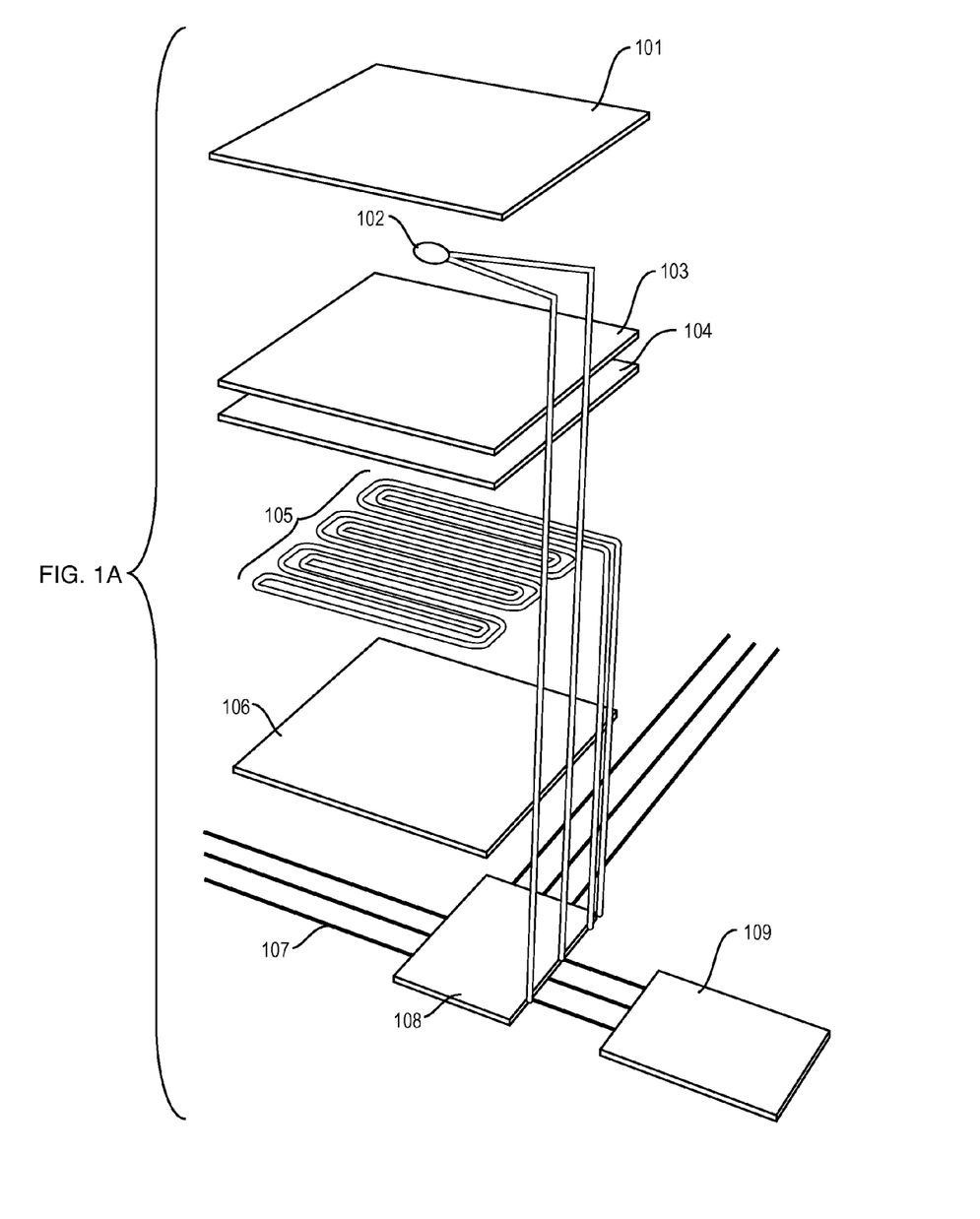
FIG. 1A is an exploded view of a calorimeter node.
Figure 1B:
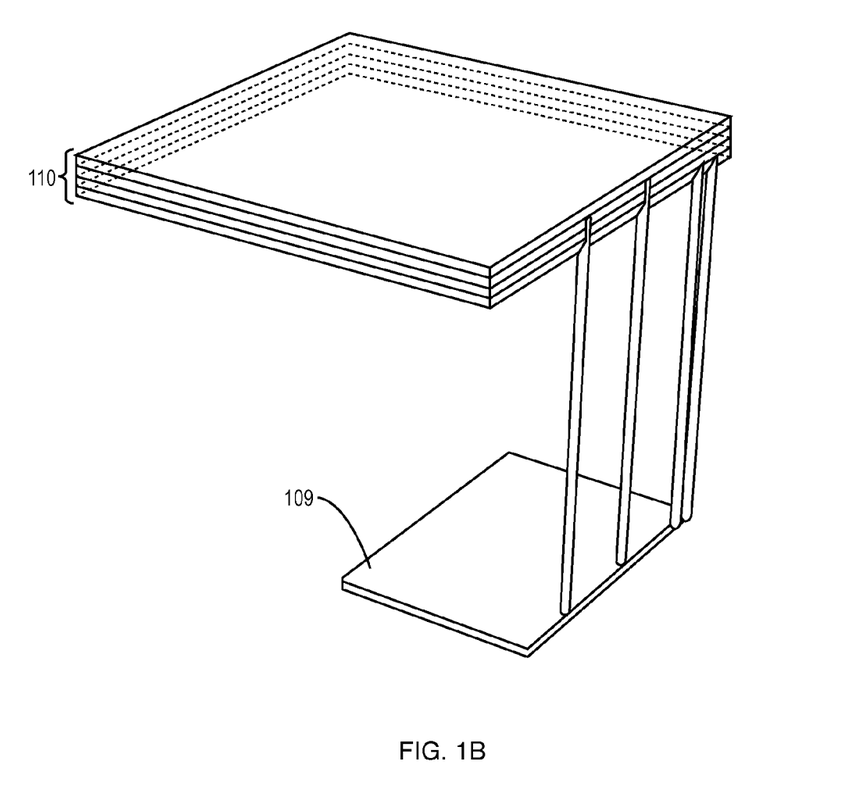
FIG. 1B is a perspective view of the same node.

In this first example, each node (each calorimeter) comprises five main components, as shown in FIGS. 1A and 1B. The first component 101, 103, 104, 106 is a substrate of carbon fiber composite, or other material with thermal expansion properties that are similar to the material being processed. The second component 105 is a heating element that is connected to the control board 108. The third 102 is a thermistor for temperature detection that is also connected to the control board, and the fourth 108 is the control board itself. The fifth component is the bundle of control cables 107 that provide power and data interconnectivity for the network. In this first example, each node uses low cost heating and sensing controller devices, can source ~800 W of heating power, can take temperature (−55 C-300 C) and current measurements, and can perform local closed loop control over the cure, by locally controlling temperature. Temperature is controlled by controlling the input power to the heating element. The first three components 101, 102, 103, 104, 105, 106 of each node comprise a monolithic unit 110 when fully assembled. The control board 108 can be attached via flexible wires 107. An additional bridge board 109 may be used to connect the network to a host process control computer 111.

FIG. 1A is an exploded view of the calorimeter shown in FIG. 1B.

In this first example, flat heating elements are included in the fiber layup schedule. These applicable resistive heating elements may comprise, e.g., simple metallic wire windings (i.e. nichrome) or flexible etched metallic films (i.e. on a polyimide substrate). When the structural fibers are conductive (such as carbon), a layer of insulator (such as polyimide film) can be used to prevent short circuiting of the heating element.

In this first example, the order of operations for assembling a node may be as follows: first form the heater, temperature detector, and substrate as a monolithic unit, and then connect the control board. A commercial panel press may be used to form the monolithic unit, with a process that includes initial vacuum pressure (~−5 bar), a preheat cycle (~80 C), pressurized resin injection (~5 bar), and a cure cycle (ramp to 180 C; hold for 120 minutes). The heater and temperature detectors are selected to be able to withstand the temperature and pressure (e.g., not to be crushed by the pressure or damaged by the temperature) used during the process of assembling the node (and, of course, during the later use of the assembled node). E.g., if the node comprises carbon fiber, then the heater and temperature detector used can withstand the pressures/temperatures involved in making carbon fiber parts.

In this first example, temperature measurements are an input to a control loop, and the amount of current passing through the heater is an output of the control loop. This closed loop control can precisely control the temperature ramps required to cure the thermoset polymers. The control algorithms used vary per application, but may include proportional correction, PID control, and model-predictive control. In this first example, temperature measurements are taken with a thermistor, and current is estimated from the PWM (pulse width modulation) duty cycle.

In this first example, a network of calorimeters may be programmed to cure a part. A starting point for this program is information about the resin cure characteristics. This can be obtained from the material's datasheet, or experimentally using the calorimeter. Then, the computer distributes the information through the network. Each unit in the network then performs cure cycle control locally—global part cure is a product of the aggregated local curing of each unit.

Figure 2:
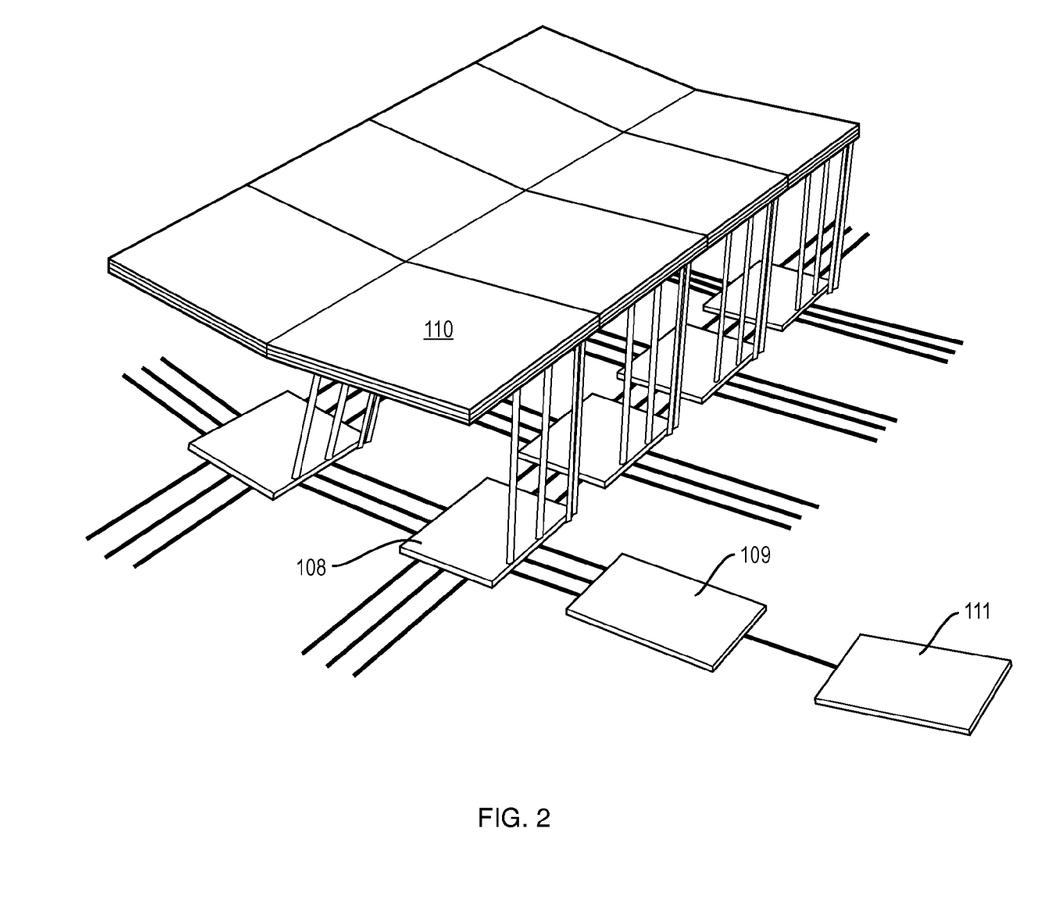
FIG. 2 is a perspective view of a network of calorimeter nodes.

In this first example, multiple calorimeters are networked together, as shown in FIG. 2.

Figure 3:
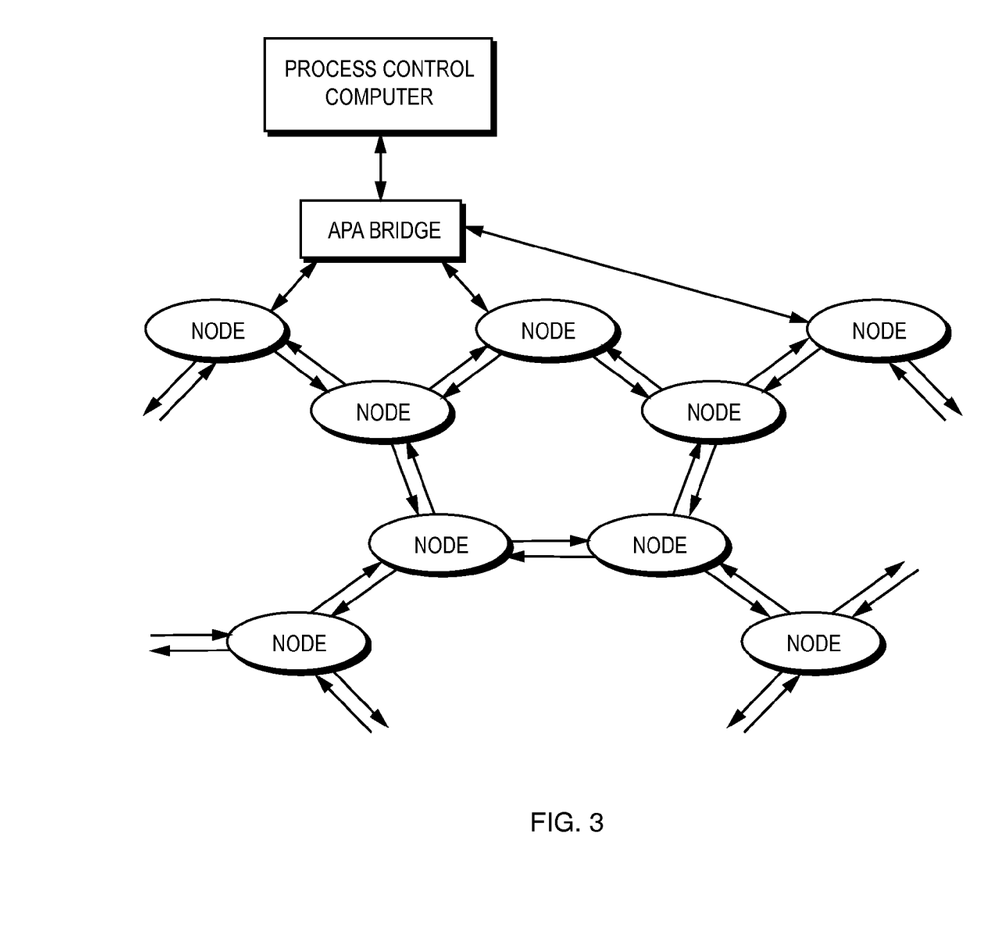
FIG. 3 is a diagram of network topology.

FIG. 3 illustrates a network topology that may be used in this first example. Each unit is connected to at most three other units, in a mesh. This topology allows for efficient power transfer as well the ability to cover any conformation, as three connected meshes can be designed as assemblages of arbitrarily shaped patches of geodesic, hyperbolic, and planar surfaces. As such, mapping of network topology to part shape conformation can be performed computationally.

In this first example, programming and monitoring of the network may be implemented using many different approaches. One approach is based on asynchronous message (packet) passing, called Asynchronous Packet Automata (APA). Flow control through the network is achieved through flow control by the individual units, of local-only inputs and outputs, allowing for scalability without excessive local processing power and memory buffer size. The control hardware and software are integrated into the control boards.

Figure 4:
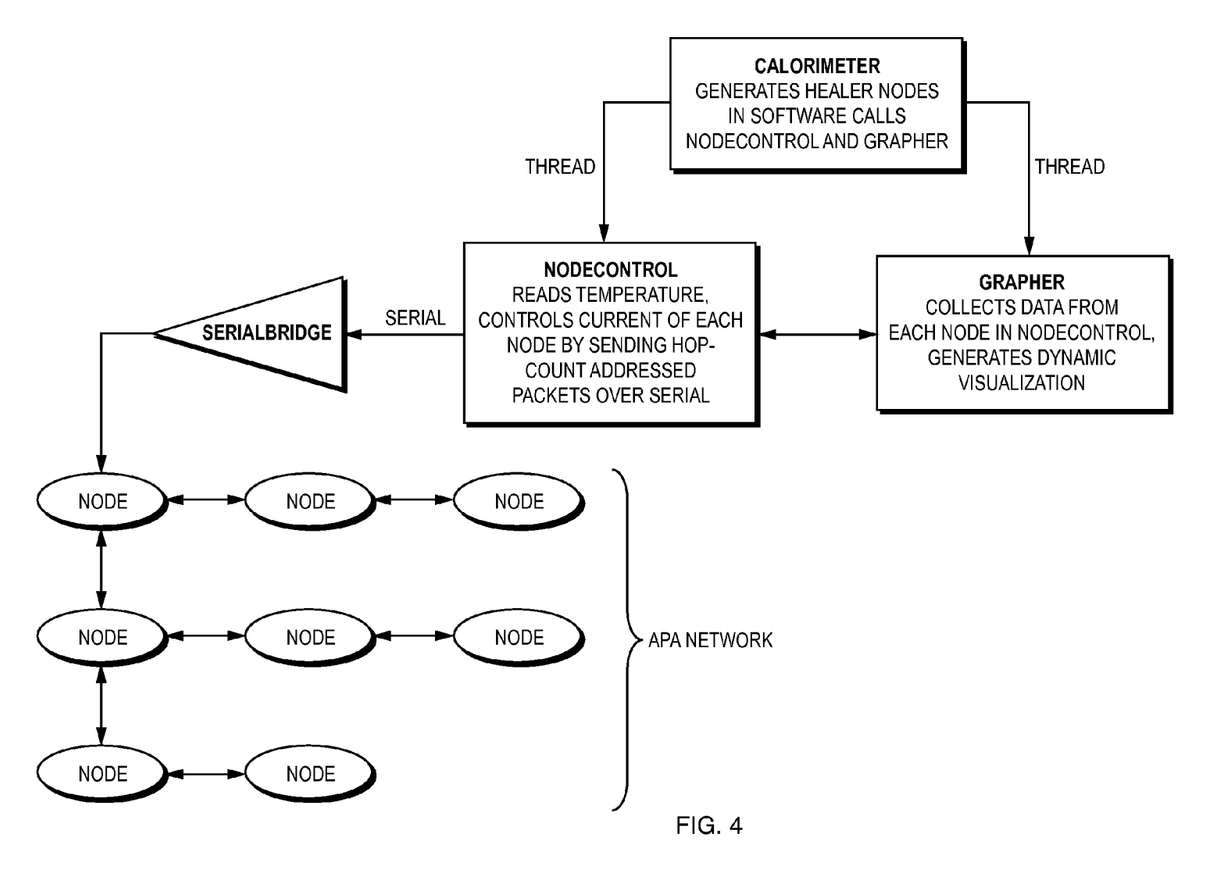
FIG. 4 is a high level block diagram of a system setup with APA (asynchronous packet automata) nodes and master control from an external computer.

In an earlier prototype of this invention, multiple nodes are connected to an APA bridge, as shown in FIG. 3. In a later prototype of this invention, only one node is connected to an APA bridge, as shown in FIG. 4. A variety of different APA network topologies may be used.

More generally, many physical processor, heater, or temperature variants are possible. Interconnect (for communication between units) can also vary. For example, conventional microprocessors may be used, with optical interconnect, or bubble logic (e.g., hydrodynamic flow field) processors with flexible tubular interconnect may be used for applications where tolerance to electromagnetic noise is a concern.

The following is a description of a prototype of this invention:

In this prototype, a smart mold heats and cures composites in place, while sensing their cure cycles. Heating modules and temperature sensors are embedded in the mold itself, running closed-loop temperature control. The smart mold uses calorimetry to determine the end of an exothermic cure.

In this prototype, to sense the curing of the epoxy in the mold, the end of the exothermic reaction is detected by monitoring the amount of energy that goes into the mold. The mold uses calorimetry to monitor the amount of heat produced in the chemical reaction. If an exothermic reaction is taking place, the amount of current needed to keep the mold at a constant temperature is less. If the temperature in a mold is kept constant and there is no exothermic reaction going on, the amount of energy required remains constant. If there is an exothermic reaction taking place within the mold, the amount of energy required to keep the mold at a constant temperature is less. To sense this, closed-loop control is implemented for the temperature levels in the mold, maintained along with a log of the current (and therefore energy) used to heat the mold.

The prototype controls a network of nodes, each equipped with a temperature sensor (glass thermistor) and a heating element (NiCr wires). The nodes perform closed loop temperature control and can be set to different temperature profiles that can correspond to the thickness of the part at that location in the mold. The nodes communicate through Asynchronous Packet Automata, where the geometry of the node's connections determines how to address them. The nodes are controlled with a series of simple commands, including current up, current down and read temperature. The entire network may be addressed from a master computer. This master computer may, for example, be used to set a desired temperature profile for curing (which profile may, but need not necessarily, vary locally). However, closed loop control is run locally at each of the nodes, to control local temperature at the node.

FIG. 4 is a high level block diagram of a system setup with APA nodes and master control from an external computer, in an illustrative instantiation of this invention.

This invention may be implemented with distributed heat regulation and cure monitoring embedded directly into the composite mold itself. The smart mold is a new smart tool for composite fabrication. (A smart mold that uses this approach can save a significant amount of energy, as compared, for example, to a large autoclave that is conventionally used to fabricate large composite parts.)

In exemplary implementations of this invention, thermal control algorithms may be used to control the curing of carbon fibre and epoxy resin composite parts using a networked mesh of embedded heater pads and temperature sensors. Each node in the network performs closed loop control locally.

Figure 5:
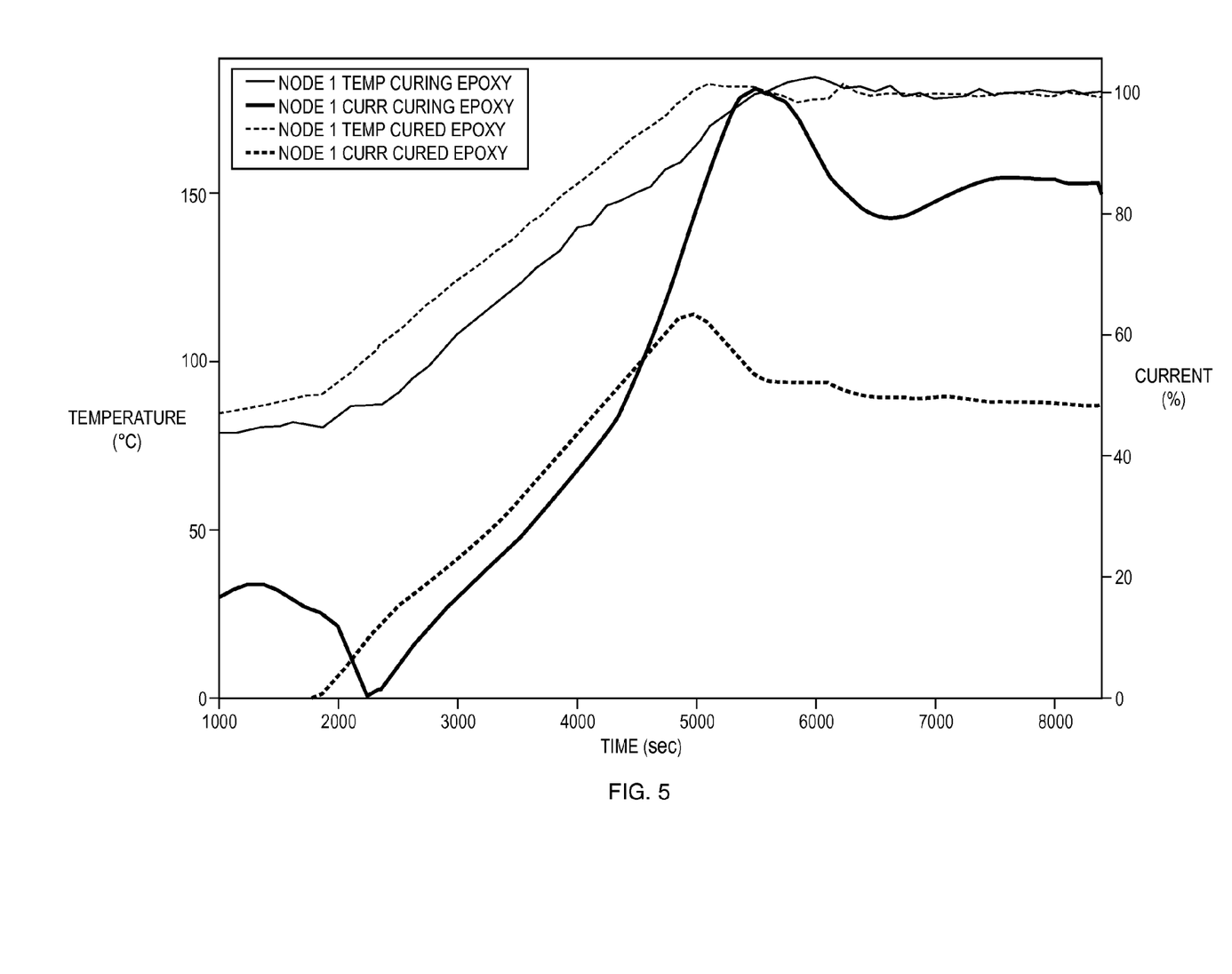
FIG. 5 shows a chart of temperature and pressure at a single node, during two different cycles. In the first cycle, epoxy is being cured, and in the second cycle, epoxy has previously been cured (before the cycle).

FIG. 5 shows a chart of temperature and pressure at a single node, during two different cycles, in an exemplary implementation of this invention. In the first cycle, epoxy is being cured, and in the second cycle, epoxy has previously been cured (before the second cycle).

In exemplary implementations of this invention, the cure process may exhibit a characteristic cure signature: while the temperature remains substantially constant because of the closed loop control, the amount of input power required to heat the mold decreases sharply. This decline is indicative of energy produced in the exothermic reaction.

Here are two non-limiting examples of how this invention may be used to control the cure of a thermosetting plastic. In these two examples, input power to a heating device is controlled, in order to precisely control temperature ramps during the cure.

First, in an early prototype of this invention: A sample cup was initially held at 120° C. Then 2 part polyurethane was introduced at t=2450 seconds, after which the exothermic reaction began and the sample began producing its own heat. The current decreased to maintain the temperature, later increasing again to maintain temperature after the end of the exothermic reaction and also the end of the cure. At t=3300 seconds, the part had finished curing and could be removed from the mold.

Second, the following cure cycle was used in an application of a prototype: A three degree (Celsius) per minute ramp to 180 C was followed by a hold at 180 C for over an hour. An early reduction in the power required to keep the epoxy at the set point occurred. This indicated the onset of cure of the epoxy. The amount of power required then rose—completion of cure was indicated by stabilization of the amount of power required to keep the part at the hold temperature.

In one of the prototypes of the invention, epoxy heat cure sensor boards with an Atmel® AVR ATTINY44A control PWM (pulse width modulation) of NiCr heating wire and read a large-range (4-400° C.) glass bead thermistor. The boards pass their data through a serial conversion bridge board to a GUI (graphical user interface) written in Python® wxWidgets®.

DEFINITIONS AND CLARIFICATIONS

Here are a few definitions and clarifications. As used herein:

"Heat transfer" means a transfer of thermal energy

"Current measurement" means (a) a measurement of current, (b) a measurement of another property from which current may be determined, or (c) receipt or output of data from which current may be determined. For example, a measurement of voltage may be a current measurement. Or, for example, receipt or output of data indicative of the duty cycle used in pulse width modulation may be a current measurement. Similar expressions shall be construed in a like manner, unless the context clearly indicates otherwise.

The term "or" is an inclusive disjunctive. For example "A or B" is true if A is true, or B is true, or both A or B are true.

The term "include" shall be construed broadly, as if followed by "without limitation".

The terms "a" and "an", when modifying a noun, do not imply that only one of the noun exists.

VARIATIONS

This invention may be implemented in many different ways. Here are some non-limiting examples:

Other control algorithms may be used, instead of or in addition to those described above. Other network topologies and other interconnects may be used. Other configurations of the control nodes may be used. The number, location and type of the processors may vary depending on the particular embodiment. For example, at least some of the processors may be remote.

This invention is not limited to the cure of a thermosetting polymer, but may be used to advantage in other types of fabrication or production in which local, precise control over temperature is desirable. E.g., in some implementations, this invention may be used to precisely and locally control temperatures while cooking food, such as while cooking an arbitrarily large and arbitrarily shaped cookie. (As opposed to conventional cooking techniques, in which huge chocolate chip cookies seem to never come out of the oven cooked quite right).

This invention may be implemented as a method of using a network to control the cure of a thermosetting plastic in a component, wherein: (a) the component comprises a composite material, (b) the network comprises multiple nodes, which nodes are spatially distributed, and (c) in each of the nodes, respectively, (i) a heat transfer device actively performs heat transfer, (ii) a temperature detector takes temperature measurements of local temperature, (iii) a processor locally performs closed loop control to generate signals to control the heat transfer device, which closed loop control is based at least in part on the temperature measurements and on estimated or measured input current to the heat transfer device, and (iv) the processor detects patterns in the local temperature and the input current that are indicative of local onset or local end of the cure. Furthermore: (1) the cure of the thermosetting plastic may involve a chemical reaction, and a change in the local temperature may be indicative of a change in thermal energy generated or absorbed by the chemical reaction; (2) the cure of the thermosetting plastic may involve a chemical reaction, and a change in input current to the heating device may be indicative of a change in thermal energy generated or absorbed by the chemical reaction; (3) in each of the nodes, respectively, the processor may perform local closed loop control based at least in part on measured changes in local heat capacity; (4) the heat transfer device may be a heating device; (5) the heat transfer device may be a cooling device; (6) the temperature detector may be a thermistor; (7) the temperature detector may be a thermocouple; (8) the heat transfer device may also be the temperature detector; (9) the temperature detector may be a resistance temperature detector; (10) either or both of the heat transfer device and temperature detector may remain embedded in the composite material after the composite material cures; (11) both the heat transfer device and the temperature detector may comprise carbon fibers, and the carbon fibers may perform inductive heating and resistance temperature detection; (12) the thermosetting plastic may undergo an exothermic chemical reaction during the cure; (13) the thermosetting plastic may undergo an endothermic chemical reaction during the cure; (14) a predictive-model control algorithm may be used to generate the control signals; and (15) an Asynchronous Packet Automata network protocol may be employed in the network.

This invention may be implemented as apparatus comprising a network of nodes for controlling the cure of a thermosetting polymer in a component, wherein: (a) the component comprises a fiber composite material, (b) the network comprises multiple nodes, which nodes are separated spatially from each other, and (c) each of the nodes, respectively, comprises (i) a heat transfer device for actively transferring thermal energy, (ii) a temperature sensor takes temperature measurements of local temperature, and (iii) a processor for locally performing closed loop control to generate signals to control the heat transfer device (which closed loop control is based at least in part on the temperature measurements and on estimated or measured input current to the heat transfer device) and for detecting patterns in the local temperature and the input current that are indicative of local onset or local end of the cure. Furthermore: (1) each of the nodes may be connected by an electrical connection to at most three other nodes in the network; (2) the cure of the thermosetting polymer may involve a chemical reaction, and a change in the local temperature measured by the temperature sensor may be indicative of a change in thermal energy generated or absorbed by the chemical reaction; and (3) a predictive-model algorithm may be used in the closed loop control.

CONCLUSION

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. A method of using a network to control the cure of a thermosetting plastic in a composite material, wherein
the network comprises multiple nodes,
each of the nodes performs local closed loop control, using calorimetry to determine stages in cure cycles,
in each of the nodes, respectively:
a heat transfer device actively performs heat transfer,
a temperature detector takes temperature measurements of local temperature,
a processor generates signals to control the heat transfer device, based at least in part on the temperature measurements and on estimated or measured input current to the heat transfer device, and
the processor detects patterns in the local temperature and the input current that are indicative of local onset or local end of the cure, and
each of at least some of the nodes have power and data connections with other nodes in the network.

2. The method of claim 1, wherein
a reduction in power needed to keep the thermosetting plastic at a set point indicates onset of cure, and
a stabilization of amount of power required to keep the thermosetting plastic at hold temperature indicates completion of cure.

3. The method of claim 1, wherein the cure of the thermosetting plastic involves a chemical reaction, and wherein a change in input current to the heating device is indicative of a change in thermal energy generated or absorbed by the chemical reaction.

4. The method of claim 1, wherein, in each of the nodes, respectively, the processor performs local closed loop control based at least in part on measured changes in local heat capacity.

5. The method of claim 1, wherein the calorimetry comprises differential scanning calorimetry.

6. The method of claim 1, wherein the heat transfer device is a cooling device.

7. The method of claim 1, wherein the calorimetry comprises differential thermal calorimetry.

8. The method of claim 1, wherein the calorimetry comprises differential thermal analysis.

9. The method of claim 1, wherein the heat transfer device is also the temperature detector.

10. The method of claim 1, wherein the temperature detector is a resistance temperature detector.

11. The method of claim 1, wherein either or both of the heat transfer device and temperature detector remain embedded in the composite material after the composite material cures.

12. The method of claim 1, wherein both the heat transfer device and the temperature detector comprise carbon fibers, and wherein the carbon fibers perform inductive heating and resistance temperature detection.

13. The method of claim 1, wherein the thermosetting plastic undergoes an exothermic chemical reaction during the cure.

14. The method of claim 1, wherein the thermosetting plastic undergoes an endothermic chemical reaction during the cure.

15. The method of claim 1, wherein a predictive-model control algorithm is used to generate the control signals.

16. The method of claim 1, wherein an Asynchronous Packet Automata network protocol is employed in the network.

17. Apparatus comprising a network of nodes for controlling the cure of a thermosetting polymer in a fiber composite material, wherein
the network comprises multiple nodes,
each of the nodes is adapted to perform local closed loop control, using calorimetry to determine stages in cure cycles,
each of the nodes, respectively, comprises:
a heat transfer device for actively transferring thermal energy,
a temperature sensor for taking temperature measurements of local temperature, and
a processor for generating signals to control the heat transfer device, based at least in part on the temperature measurements and on estimated or measured input current to the heat transfer device, and detecting patterns in the local temperature and the input current that are indicative of local onset or local end of the cure.

18. The apparatus of claim 17, wherein the patterns include a reduction in power needed to keep the thermosetting plastic at a set point, which reduction is indicative of onset of cure.

19. The apparatus of claim 17, wherein each of at least some of the nodes have power and data connections with other nodes in the network.

20. The apparatus of claim 17, wherein the calorimetry comprises differential scanning calorimetry, differential thermal calorimetry, or differential thermal analysis.

* * * * *